United States Patent Office 3,391,476
Patented July 9, 1968

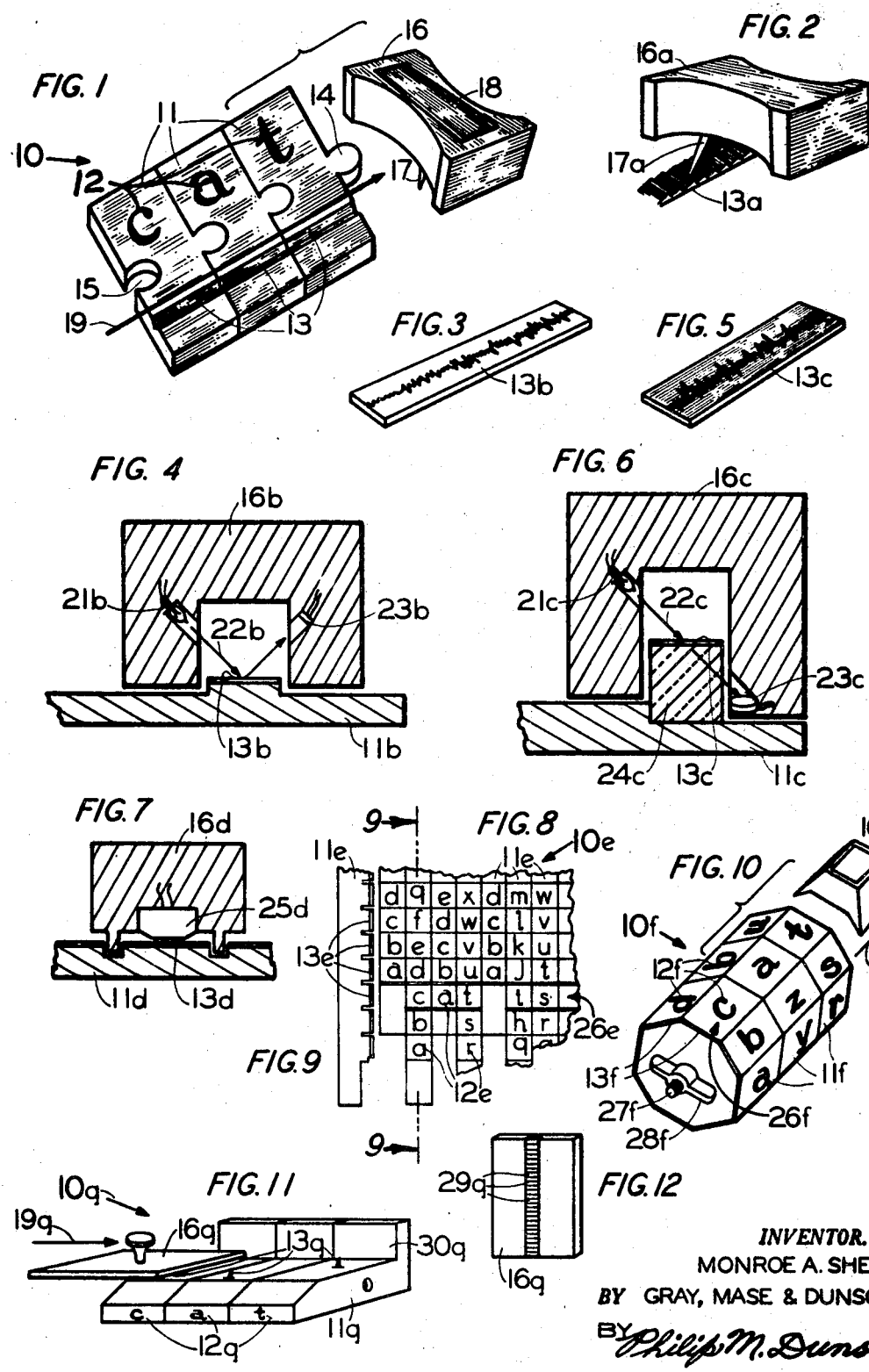

3,391,476
LANGUAGE FAMILIARIZATION APPARATUS
Monroe A. Sher, 523 Terrace Ave.,
Cincinnati, Ohio 45220
Filed Feb. 10, 1966, Ser. No. 526,427
2 Claims. (Cl. 35—35)

ABSTRACT OF THE DISCLOSURE

Printed words are formed by aligning together a sequence of members, each having on it an I.T.A. symbol and a sound track for audibly reproducing the phoneme represented by the symbol. A pickup is moved along the aligned sound tracks to reproduce the sound of each word so formed.

---

This invention relates to language familiarization. It has to do particularly with apparatus for familiarizing persons with written symbols and combinations thereof in a language together with the sounds associated therewith.

As used herein, the term "language" includes not only the many common spoken and written languages such as English, German, French, Spanish, Russian, etc., with their traditional alphabets, but also such languages as written in other similar alphabets, which may be largely phonetic, such as the Initial Teaching Alphabet (I.T.A.) and Unifon, which are used in the early stages of teaching persons to read in English.

Developed by Sir James Pitman, the Initial Teaching Alphabet includes nearly all of the lowercase letters used in the normal English alphabet (traditional orthography) plus several other symbols, making a total of 44. It is substantially a phonetic alphabet in that each symbol is pronounced in roughly the same way in any word where it appears. Unifon is a somewhat similar type of alphabet, devised by John Malone, comprising 40 symbols based largely on the capital letters of traditional orthography.

Unifon, as yet, has enjoyed only limited experimental use. I.T.A., on the other hand, though it has been available for only two years in this country, is being tried out in schools in almost every State, over 10,000 children in all. In England, where it originated, I.T.A. is currently being taught to over 100,000 children. Educators are enthusiastic about its effects: chiefly, earlier, stronger reading skills and, not surprisingly, writing skills. At present I.T.A. is being used not only with normal school children but also with the educable retarded, adult illiterates, and the emotionally disturbed. The apparatus of this inventoin can significantly increase the ease of learning I.T.A. or any other relatively phonetic alphabet.

Typical apparatus according to the present invention for familiarizing persons with written symbols and combinations thereof in a language together with the sounds associated therewith comprises a plurality of members, each bearing a symbol that represents at least one phoneme (the smallest unit of speech that distinguishes one utterance from another in the language), and each comprising means related to the phoneme, the related means differing from the means related to a different phoneme on another member bearing a different symbol, means for maintaining a plurality of the members in any of a plurality of selectable sequences of adjacent members wherein the symbols on the members form syllables, words, and other combinations, and means operable with the phoneme related means on a sequence of adjacent members to reproduce audibly the phonemes represented by the symbols in the sequence indicated by the symbols on the members and thus to reproduce any syllables, words, and other combinations represented by the sequence of symbols. The phoneme related means and the means operable therewith typically comprise relatively movable sound producing means such as mechanically vibratory means; visually variable areas and photosensitive response means; or areas of variable magnetic strength and means responsive to magnetic variation (such as magnetic tape and a magnetic reproducing head).

Of course, a member may bear a symbol, such as a number or a group of letters, representing a plurality of phonemes. Such a member comprises means related to the combination of phonemes represented, the related means differing from that on another member bearing a different symbol.

The sequence maintaining means may comprise means for mechanically fitting and holding a plurality of the members in adjacent positions, as where the members comprise mating and interlocking components. The symbols on the members preferably are substantially aligned, and the phoneme related means are aligned, when the members are held in their adjacent positions.

In another form of the invention each member bears a plurality of different symbols, each at a different location thereon along with means related to the phoneme represented by the symbol, and the members are assembled side-by-side in relatively movable arrangement so that different sequences of the symbols and their associated phoneme related means can be selectively aligned. In another embodiment, the operable means comprises a plurality of means at different respective locations thereon, each related to a phoneme and responsive to relative motion with adjacent phoneme related means on the members, and the means on the members comprise means for inducing responses selectively at the different respective locations on the operable means.

In the drawings:

FIG. 1 is a simplified perspective view of typical apparatus according to the present invention.

FIG. 2 is a simplified perspective view of a modified form of the scanning means shown in FIG. 1.

FIG. 3 is a simplified perspective view of a modified form of phoneme related means as used in apparatus according to this invention.

FIG. 4 is a simplified sectional view of another form of apparatus according to the present invention.

FIG. 5 is a simplified perspective view of another form of phoneme related means.

FIG. 6 is a simplified cross sectional view of another form of apparatus according to this invention.

FIG. 7 is a simplified sectional view of still another form of such apparatus.

FIG. 8 s a plan view of yet another form of such apparatus.

FIG. 9 is a sectional view taken in the plane 9—9 in FIG. 8.

FIG. 10 is a simplified perspective view of a further form of apparatus according to the present invention.

FIG. 11 is a simplified perspective view of still another form of such apparatus.

FIG. 2 is a bottom plan view of the scanner in FIG. 11.

In FIG. 1 a typical form of apparatus 10 according to the present invention comprises a plurality of members 11, each bearing a symbol 12 that represents a phoneme. The three members 11 shown in FIG. 1 bear the phonemes "c," "a," and "t," respectively, forming the word "cat" in the Initial Teaching Alphabet (I.T.A.) just as the same symbols spell the word "cat" in traditional orthography. It is a feature of the Initial Teaching Alphabet that most common words look the same or nearly the same as they do in traditional orthography. Each member 11 is provided with a groove 13 similar to a small portion of the groove in a phonograph record, the first comprising a recording of the "c" sound, the second comprising a recording of the "a" sound, and the third a recording of the "t" sound as recorded from a human voice. Preferably the grooves 13 are derived from recordings of ordinary speech rather than of individual sounds.

Each member 11 has a projection 14 on one end and a recess 15 on the opposite end positioned and shaped such that the members comprise mating and interlocking components that can be fit together in adjacent and contiguous positions as shown in FIG. 1 and maintained in such positions by the interlocking projections 14 and recesses 15. A plurality of members 11 may of course be placed in any of a plurality of selectable sequences of adjacent members wherein the symbols 12 on the members 11 form syllables, words, and other combinations and are held together by the interlocking means 14, 15.

A scanner 16, comprising a needle 17 similar to an ordinary phonograph needle and a diaphragm 18, is held by the person using the apparatus 10 and is moved from left to right as is indicated by the arrow 19 across the members 11 with the point of the needle 17 resting in the grooves 13 of the members 11. Thus the scanner means 16 are operable with the phoneme related groove means 13 on the sequence of adjacent members 11 to reproduce audibly the phonemes "c," "a," "t" represented by the symbols 12 in the sequence indicated in FIG. 1 and thus to reproduce the word "cat" represented by the sequence of symbols.

The members 11 shown in FIG. 1 could be placed in the opposite order from that shown, spelling "tac" in the Initial Teaching Alphabet, corresponding to the word "tack" in traditional orthography (it could also be spelled "tak" in I.T.A.). Moving the scanner 16 from left to right over the members 11 as so rearranged would of course produce the word "tack" audibly.

A member 11 may bear a symbol representing more than one phoneme. Such a symbol may be a number (1, 2, 7, 100, etc.) or a group of letters of our traditional alphabet representing a common prefix, suffix, or other syllable, or a short word (un, dis, re, ed, tion, and, the, etc.). The means 13 is related to the syllable or other sound represented by the symbol. Words and even sentences can be formed and reproduced audibly with fewer such members 11 than would be needed if each were limited to one phoneme.

The phoneme related groove means 13 and the scanner means 16 operable therewith comprise relatively movable sound producing means that are mechanically vibratory. The needle 17 may be connected mechanically to the diaphragm 18 to amplify the vibrations, or the needle 17 may be attached to a transducer and amplifier (not shown) connected to drive the diaphragm 18 at a suitable volume level. If desired, the amplifier and diaphragm may be housed in a separate container from the scanner 16, but using subminiature or microminiature components and circuits everything can be housed in the scanner 16.

FIG. 2 shows other simple mechanically vibratory means comprising a vibratory tape 13a having projections and indentations such as to produce audible vibrations when a scanner 16a having a stylus 17a is moved across it under a light pressure. The stylus 17a may be designed to vibrate loud enough to be heard distinctly or it may be combined with other apparatus in obvious ways as discussed above. The vibratory tape 13a may replace the groove 13 in each member 11 as shown in FIG. 1. Of course the scanner 16a with its stylus 17a may be used with the grooves 13, and the scanner 16 with its needle 17 may be used with the vibratory tape 13a where desired.

Various other relatively movable sound producing means may also be used. Several such means are shown in FIGS. 3–7.

In FIG. 3 a printed recording on a band of opaque material 13b comprises the means related to the phoneme represented by the symbol (not shown) on a member 11b as shown in cross section in FIG. 4. The scanning means 16b operable with the phoneme related means 13b may include a light source 21b positioned to direct a beam of light 22b to reflect off the surface of the opaque tape 13b onto a photosensitive element 23b, such as a semiconductor device, which may be connected to an amplifier and loud speaker (not shown) either inside the scanning means 16b or in a separate container.

In FIG. 5 a printed recording on a band of translucent or transparent material 13c comprises the means related to the phoneme represented by the symbol (not shown) on a member 11c as shown in cross section in FIG. 6. The scanning means 16c operable with the phoneme related means 13c may include a light source 21c positioned to direct a beam of light 22c through the translucent or transparent tape 13c and a transparent supporting block 24c onto a photosensitive element 23c, such as a semiconductor device, which may be connected to an amplifier and loudspeaker (not shown) either inside the scanning means 16c or in a separate container.

As shown in cross-section in FIG. 7, a magnetic tape 13d comprises the means related to the phoneme represented by the symbol (not shown) on a member 11d. The scanning means 16d operable with the phoneme related means 13d includes a magnetic playback head 25d positioned just above the magnetic tape 13d. The magnetic tape 13d preferably has a protective coating such as a thin layer of tough plastic on which the magnetic head 25d can rest as it is moved along the magnetic tape 13d. The magnetic head 25d may be connected to an amplifier and loudspeaker (not shown) either inside the scanning means 16d or in a separate container.

FIGS. 8 and 9 show apparatus wherein each member 11e comprises a strip bearing a plurality of different symbols 12e, each in a different location thereon along with means 13e, such as magnetic tape or any of the other forms of phoneme related means shown in FIGS. 1–7, related to the phoneme represented by the symbol 12e thereon. The members are assembled side-by-side in relatively movable arrangement so that different sequences of the symbols 12e and their associated phoneme related means 13e can be selectively aligned as along the line 26e containing part of a sentence "the cat is . . . ." Where the phoneme related means 13e comprise magnetic tape, scanning means such as the scanner 16d with its magnetic pick-up head 25d, as in FIG. 7, may be used with the aligned strips 11e of FIGS. 8 and 9 to reproduce audibly the sentence or another combination of symbols 12e aligned along a line, as at 26e in FIG. 8.

FIG. 10 shows similar apparatus 10f wherein each member 11f comprises a faceted cylinder bearing a plurality of different symbols 12f each at a different location around the cylinder along with means 13f related to the phoneme represented by the symbol 12f thereon. The members 11f are assembled side-by-side in relatively movable arrangement around their common axis to which they are held by a threaded member 27f and a wing nut 28f on each end thereof. By rotating the members 11f relatively to one another, different sequences of symbols 12f and their associated phoneme related means 13f can be selectively aligned, as along the line 26f. Scanning means 16f which may be similar to any of the means 16, 16a–16d, depending on the specific form of the related means 13f, may be used with the assembled members 11f, by sliding it along a line 26f from left to right as indicated by the arrow 19f to reproduce the sequence of phonemes.

In FIGS. 8–10, the phoneme related means 13e and 13f are considered to be made of magnetic tape, which of course does not affect the appearance of the faces of the members 11e and 11f, respectively, across which it extends, as viewed in FIGS. 8 and 10.

FIGS. 11 and 12 show another form of apparatus 10g according to the present invention wherein the operable scanner means 16g comprises a plurality of means 29g at different respective locations thereon (FIG. 12), each related to a phoneme and responsive to relative motion with adjacent phoneme related means 13g on the members 11g, each of which bears a symbol 12g representing the phoneme. The phoneme related means 13g of the members 11g comprise means for inducing responses at the different respective locations 29g on the scanner means 16g. A vertical guide 30g on each member 11g facilitates operation of the apparatus 10g since the scanner 16g can be placed against the guide 30g while being moved to the right as indicated by the arrow 19g to reproduce the sounds of the phonemes represented by the symbols 12g in sequence. As shown in FIG. 11 the phoneme related means 13g comprise styluses. The means 29g on the scanner 16g may comprise either vibratory tape as in FIG. 2 or record grooves as in FIG. 1. Of course other combinations of relatively movable means, such as those suggested in other figures of the drawing, may be substituted with suitable modifications.

From the foregoing disclosure it is apparent that the present invention provides apparatus with which children and others learning a new language can manipulate the individual symbols of an alphabet in the language and can easily and immediately listen to the sounds of the syllables, words and other combinations formed by the symbols. The user becomes somewhat of an explorer in the language. In an entertaining manner he can satisfy his curiosity by trying out any desired combinations of symbols. He quickly learns to associate the symbols with their pronunciations and to construct words out of the symbols. He may also use the apparatus to sound out unfamiliar words in books using the same alphabet. With this apparatus each child can learn on his own and at his own pace.

As a self-paced learning aid the apparatus can help to accelerate education by providing the schools with younger readers. It can significantly reduce the time to teach children to read. By reducing the frustration involved in learning to read and by helping make reading self-motivated rather than an imposition, the apparatus can improve the children's attitudes toward reading and hence toward all education. The apparatus can also be used to help in the diagnosis and education of retarded and otherwise handicapped children. The National Council of Teachers of English has estimated that 4,000,000 elementary school pupils have reading disabilities. Reading skill is clearly the springboard to all further education. Improvement in techniques of learning to read obviously can affect our entire educational system.

The apparatus can also be an excellent research tool for psychologists and educators. Having the special merit of bringing together letters and sounds in a one-to-one relationship, it can significantly reduce the complexity of the learning process, and promote its more effective analysis. Among the important issues this invention may help to explore are: the effect of bimodal (auditory and visual) presentation on learning at various developmental stages; the effects of bimodal presentation on children having preferred modes of learning; the effects of self-paced as against teacher-paced learning; the effect of grapheme-phoneme equivalence on the processes of encoding and decoding; and the differentiation of types of learning problems.

Various equivalent forms of the invention may be made. The plurality of symbols and corresponding phoneme related means provided for each position in a sequence, as in FIGS. 8–10, could of course be arranged as pages in a stenographer's spiral bound tablet, with a sequence of adjacent coaxial tablets held together on their common axis (along the top edge) about which the pages turn. To form a desired combination, the leftmost tablet could be opened to the page containing, say, anti, the next to dis, the next several to e, s, t, a, b, . . . etc. Cards foldable between modular areas could be used to provide various arrangements of symbols, the modular areas being equivalent to the members 11 in FIG. 1. The apparatus of this invention can be combined with appropriate visual aids such as pictures. For example, a jigsaw picture puzzle can be provided in which at least some of the pieces contain symbols and phoneme related means. When the picture is assembled the child can read and hear the legend on the picture.

Of course, many refinements can be added where desired in the various embodiments of the invention. For example one or more rollers may be provided to drive the scanning means relative to the phoneme related means at substantially constant speed. The rollers can be driven electrically, by a spring motor, by an inertia drive, or by other suitable means. The arranging of the members bearing the symbols and the reproduction of the sounds can be mechanized or automated to any desired extent.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

I claim:
1. Apparatus for familiarizing persons with written symbols and combinations thereof in a language together with the sounds associated therewith comprising:
   a plurality of members, each bearing a symbol that represents at least one phoneme, and each comprising means related to said phoneme, said related means differing from the means related to a different phoneme on another said member bearing a different symbol,
   means for maintaining a plurality of said members in any of a plurality of selectable sequences of adjacent members wherein the symbols on said members form syllables, words, and other combinations,
   and means operable with said phoneme related means on a sequence of adjacent members to reproduce audibly the phonemes represented by said symbols in the sequence indicated by the symbols on the members and thus to reproduce any syllables, words, and other combinations represented by the sequence of symbols,
   wherein each said member bears a plurality of different said symbols, each at a different location thereon along with means related to the phoneme represented by the symbol, and said members are assembled side-by-side in relatively movable arrangement so that different sequences of said symbols and their associated phoneme related means can be selectively aligned.

2. Apparatus for familiarizing persons with written symbols and combinations thereof in a language together with the sounds associated therewith comprising:
   a plurality of members, each bearing a symbol that represents at least one phoneme, and each comprising means related to said phoneme, said related means differing from the means related to a different phoneme on another said member bearing a different symbol,
   means for maintaining a plurality of said members in any of a plurality of selectable sequences of adjacent members wherein the symbols on said members form syllables, words, and other combinations,
   and means operable with said phoneme related means on a sequence of adjacent members to reproduce audibly the phonemes represented by said symbols in the sequence indicated by the symbols on the members and thus to reproduce any syllables, words, and other combinations represented by the sequence of symbols, wherein said operable means comprises a plurality of means at different respective locations thereon, each related to a phoneme and responsive to relative motion with adjacent said phoneme related means on said members, and said means on said members comprise means for inducing responses selectively at said different respective locations on said operable means.

References Cited

UNITED STATES PATENTS

| 2,369,572 | 2/1945 | Kallmann | 35—35.3 |
| 3,325,916 | 6/1967 | Greenlee | 35—35.3 |

FOREIGN PATENTS

A.D. 25,370  1901  Great Britain.

EUGENE R. CAPOZIO, *Primary Examiner.*

W. H. GRIEB, *Assistant Examiner.*